(12) United States Patent
Gorman

(10) Patent No.: US 7,286,473 B1
(45) Date of Patent: Oct. 23, 2007

(54) NULL PACKET REPLACEMENT WITH BI-LEVEL SCHEDULING

(75) Inventor: Michael A. Gorman, Gardena, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 1121 days.

(21) Appl. No.: 10/192,960

(22) Filed: Jul. 10, 2002

(51) Int. Cl.
*H04L 12/26* (2006.01)

(52) U.S. Cl. ........................ 370/230

(58) Field of Classification Search ........ 370/229–235, 370/351, 389, 394, 395.2, 395.21, 395.4, 370/395.41, 395.42, 412–419
See application file for complete search history.

(56) References Cited

U.S. PATENT DOCUMENTS

| | | |
|---|---|---|
| 3,627,914 A | 12/1971 | Davies |
| 3,843,942 A | 10/1974 | Pierret et al. |
| 5,337,041 A | 8/1994 | Friedman |
| 5,363,147 A | 11/1994 | Joseph et al. |
| 5,404,315 A | 4/1995 | Nakano et al. |
| 5,424,770 A | 6/1995 | Schmelzer et al. |
| 5,448,568 A | 9/1995 | Delpuch et al. |
| 5,461,619 A | 10/1995 | Citta et al. |
| 5,463,620 A | 10/1995 | Sriram |
| 5,506,844 A | 4/1996 | Rao |
| 5,532,753 A | 7/1996 | Buchner et al. |
| 5,579,404 A | 11/1996 | Fielder et al. |
| 5,625,743 A | 4/1997 | Fiocca |
| 5,650,825 A | 7/1997 | Naimpally et al. |

(Continued)

FOREIGN PATENT DOCUMENTS

EP  EP 1 150 446 A2  10/2001

(Continued)

OTHER PUBLICATIONS

Bhaskaran, V. Ed—Institute of Electrical and Electronics Engineers: "Mediaprocessing in the Compressed Domain" Digest of Papers of COMPCON (Computer Society Conference) 1996 Technologies for the Information Superhighway. Santa Clara, Feb. 25-28, 1996, Digest of Papers of the Computer Society Computer Conference COMPCON, Los Alamitos, IEEE Comp. Soc. Press, vol. Conf. 41, Feb. 25, 1996 pp. 204-209, XP010160896—ISBN: 0-8186-7414-8 *abstract*, *p. 208, right-hand column, paragraph 3—p. 209, left-hand column, paragraph 1*.

(Continued)

*Primary Examiner*—Dmitry Levitan
(74) *Attorney, Agent, or Firm*—Georgann S. Grunebach

(57) ABSTRACT

A system and method for null packet replacement having a global scheduler (12) select data from a plurality of self-managed queues (14) to insert in to the data stream in place of null packets. The queues (14) managed by the global scheduler have rules that are private to each queue Q1, Q2, ... QN. The global scheduler (12) has a set of rules (16) for prioritizing the queues (14). The global scheduler (12) knows the average data rate for each queue (14) and has a priority assigned to each queue (14). Rules for the global scheduler policy (16) are limited to the order of service for the queues. The present invention is advantageous in that the order of service may be changed at the global scheduler (12) without affecting the independent queues (14).

14 Claims, 2 Drawing Sheets

U.S. PATENT DOCUMENTS

| | | | |
|---|---|---|---|
| 5,657,454 A | 8/1997 | Benbassat et al. | |
| 5,666,430 A | 9/1997 | Rzeszewski | |
| 5,729,556 A | 3/1998 | Benbassat et al. | |
| 5,751,723 A | 5/1998 | Vanden Heuvel et al. | |
| 5,778,077 A | 7/1998 | Davidson | |
| 5,802,068 A | 9/1998 | Kudo | |
| 5,822,018 A | 10/1998 | Farmer | |
| 5,831,681 A | 11/1998 | Takahashi et al. | |
| 5,854,658 A | 12/1998 | Uz et al. | |
| 5,864,557 A | 1/1999 | Lyons | |
| 5,877,821 A | 3/1999 | Newlin et al. | |
| 5,898,675 A | 4/1999 | Nahumi | |
| 5,912,890 A | 6/1999 | Park | |
| 5,966,120 A | 10/1999 | Arazi et al. | |
| 5,987,031 A * | 11/1999 | Miller et al. | 370/412 |
| 5,991,812 A | 11/1999 | Srinivasan | |
| 6,064,676 A * | 5/2000 | Slattery et al. | 370/412 |
| 6,137,834 A | 10/2000 | Wine et al. | |
| 6,169,584 B1 | 1/2001 | Glaab et al. | |
| 6,169,807 B1 | 1/2001 | Sansur | |
| 6,169,973 B1 | 1/2001 | Tsutsui et al. | |
| 6,188,439 B1 | 2/2001 | Kim | |
| 6,195,438 B1 | 2/2001 | Yumoto et al. | |
| 6,208,666 B1 | 3/2001 | Lawrence et al. | |
| 6,252,848 B1 | 6/2001 | Skirmont | |
| 6,259,695 B1 | 7/2001 | Ofek | |
| 6,298,089 B1 | 10/2001 | Gazit | |
| 6,369,855 B1 | 4/2002 | Chauvel et al. | |
| 6,389,019 B1 * | 5/2002 | Fan et al. | 370/395.42 |
| 6,430,233 B1 | 8/2002 | Dillon et al. | |
| 6,687,247 B1 * | 2/2004 | Wilford et al. | 370/392 |
| 6,765,867 B2 * | 7/2004 | Shanley et al. | 370/229 |
| 6,931,370 B1 | 8/2005 | McDowell | |
| 7,035,278 B2 * | 4/2006 | Bertram et al. | 370/458 |
| 2001/0016048 A1 | 8/2001 | Rapeli | |
| 2001/0047267 A1 | 11/2001 | Abiko et al. | |
| 2002/0004718 A1 | 1/2002 | Hasegawa et al. | |
| 2002/0085584 A1 | 7/2002 | Itawaki et al. | |
| 2002/0146023 A1 * | 10/2002 | Myers | 370/412 |
| 2002/0169599 A1 | 11/2002 | Suzuki | |
| 2002/0173864 A1 | 11/2002 | Smith | |
| 2004/0199933 A1 | 10/2004 | Ficco | |

FOREIGN PATENT DOCUMENTS

| | | |
|---|---|---|
| GB | 2341745 | 3/2002 |
| JP | 10 284960 | 10/1998 |
| JP | 2001-111969 | 4/2001 |
| JP | 2001 169248 | 6/2001 |
| WO | WO99/53612 | 10/1999 |
| WO | WO 01/30086 | 4/2001 |

OTHER PUBLICATIONS

Brandenburg, K. et al.: ISO-MPEG-1 Audio: A Generic Standard for Coding of High-Quality Digital Audio Journal of the Audio Engineering Society, Audio Engineering Society. New York, US, vol. 42, No. 10, Oct. 1994, pp. 780-792, XP000978167—ISSN: 0004-7554 *abstract*, *p. 785, left-hand column, paragraph 2—p. 786, left hand column, paragraph 1; figures 2,3*.

Hans, M. et al.: "An MPEG Audio Layered Transcoder"—Preprints of Papers Presented at the AES Convention, XX, XX, Sep. 1998, pp. 1-18, XP001014304—*abstract*, *p. 11, paragraph 1*.

Govindan et al., *Scheduling And IPC Mechanisms For Continuous Media*, 13th ACM Symposium On Operating Systems Principles, 1991, 13 pages.

* cited by examiner

NULL PACKET REPLACEMENT WITH BI-LEVEL SCHEDULING

TECHNICAL FIELD

The present invention relates generally to null packet replacement into a broadcast data stream and more particularly to a method of self-managed queues for null packet replacement to efficiently utilize and maximize available bandwidth.

BACKGROUND OF THE INVENTION

Currently, in satellite digital video delivery systems, a user or subscriber installs a small parabolic reflector and special electronics at the premises. These systems use the direct broadcast satellite "DBS" spectrum to deliver digital video signals to a user. In these systems, all of the available programming content is transmitted directly to all users from specialized satellites in, for example, a geosynchronous earth orbit. Geosynchronous orbit refers to an orbit in which a satellite orbiting the earth remains in a fixed position relative to a point on the earth. A receiver unit located at the user premises decodes the data stream in order to extract the desired programming.

It is important in digital broadcasting to control the rate at which digital data packets are transmitted. In the absence of real content in a broadcast stream, it is generally practiced to insert a null packet in order to maintain a periodic data rate. It is generally known to calculate an insertion timing and then insert a null packet into the coded data thereby maintaining a desired data rate.

However, a significant disadvantage to this method is that the null packet, which contains useless data, takes up valuable bandwidth. In DBS, the availability of bandwidth is limited and with increased users and content, it is important to efficiently utilize all the bandwidth that is available. The insertion of null packets diminishes the effective bandwidth of the broadcast stream.

Another disadvantage to the null packet insertion method, is that the null packet insertion rate and their duration are non-deterministic. This means that a receiver receiving the data may not have the buffer capacity to handle the amount of data queued. The result is a highly undesirable interruption in service to a subscriber.

There is a need for a method of maximizing the broadcast stream bandwidth without incurring buffer overflow.

SUMMARY OF THE INVENTION

The present invention is a method for maximizing bandwidth usage through the use of self-managed queues that have independent programmable policies that interface with a global scheduler. Each queue manages its current state depending on the buffering capability and the class of data queued. An algorithm is used to maintain maximum bandwidth usage. In this respect, the local state maintained by each queue is available to the global scheduler.

It is an object of the present invention to maximize a broadcast stream bandwidth. It is another object of the present invention to ensure buffer overflow is avoided. It is still another object of the present invention to remove null packets and insert background data to make more efficient use of available bandwidth.

It is a further object of the present invention to provide a method of self-managed queues that have independent programmable policies that interface with a global scheduler. It is still a further object of the present invention to use an algorithm to interface the self-managed queues with the global scheduler, thereby maintaining maximum bandwidth usage.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
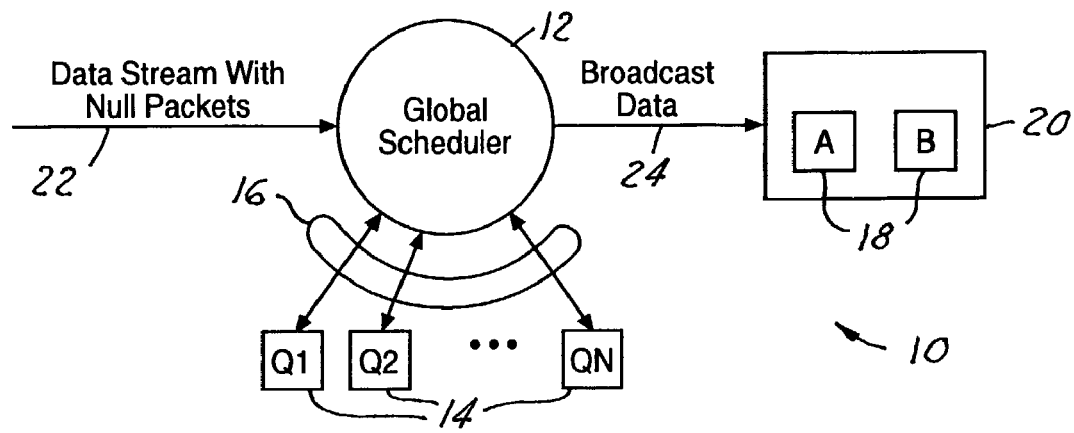
FIG. 1 is a block diagram of the present invention.

The present invention is a system and method for maximizing and maintaining a maximum bandwidth usage of a broadcast stream. Referring to FIG. 1 there is shown a block diagram of the system 10 of the present invention. A global scheduler 12 interfaces with a plurality of self-managed, programmable queues 14, Q1, Q2, Q3 . . . QN. The interface is by way of a policy 16, in the global scheduler, having independent, programmable rules that govern the interface between the global scheduler 12 and each of the self-managed queues 14.

A data stream 22, having null packets, arrives at the global scheduler 22. The global scheduler 22 communicates with the queues 14 to replace the null packets with background data. The background data is typically not related to video, such as conditional access messages, or data that does not have significant temporal bounds.

Each queue 14 is self-managed. The queues manage their current state depending on a buffering capability 18A, 18B at each client A, B for a receiver 20 and a class of data that is queued. It should be noted that one receiver and two clients are shown for example purposes only. It is possible to have a group of receivers and any number of clients. The local state maintained at each queue 14 is available to the global scheduler 12 to assist in maintaining maximum throughput of substantive broadcast data. The receiver 20 has a fixed amount of memory for storage.

The queue 14 has a policy for sending and receiving data that is typically unique for each queue. In addition, the policy for each queue is separate and distinct from the policy the global scheduler uses in servicing the queues. For example, it may be that a particular queue has a policy that a receiving entity will not overflow a buffer on reception. A buffer may have a maximum buffer size of 50 bytes. The buffer is served once per second. The queue may have a policy that requests to send data at a maximum bandwidth up to 50 bytes to that particular receiver, and then "sleeps" until the next period. It is possible that each queue would have a different policy.

However, the only information the global scheduler 12 is aware of is whether or not the queue is "ready-to-run". A queue 14 having data would initially be deemed "ready to run". When the global scheduler 12 removes data from a queue 14 that is representative of the maximum buffering 18 of the client's receiver 20, the queue declares itself "not-ready-to-run". In such a case, the global scheduler 12 would not consider this particular queue for making its scheduling decisions. Once a timer expires, and the queue 14 has data, the queue once again announces its "ready-to-run" status to the global scheduler 12.

According to the system of the present invention, the global scheduler 12 selects data from the queues 14 to insert in to the data stream instead of null packets. The queues 14 managed by the global scheduler have rules that are private to each queue Q1, Q2, . . . QN. These rules may contain limits such as a maximum data burst rate, a minimum inter-packet time, or a time deadline. These are just a few examples of possible rules. The rules in each queue's policy are determined by the client receiver or the processing function running on the receiver. It is the responsibility of each queue to ensure the receiver does not become overwhelmed, by producing more data than can be received at the receiver.

The queue 14 presents itself as "ready-to-run" or "not-ready-to-run" to the global scheduler 122. The global scheduler has its own set of rules for prioritizing the queues 14. The global scheduler 12 knows the average data rate for each queue 14 and has a priority assigned to each queue 14. Rules for the global scheduler policy 16 are limited to the order of service for the queues. The order may be priority based, it may be round-robin based, or it may be any one of many policies too numerous to mention herein, but known those skilled in the art.

The present invention is advantageous in that the order of service may be changed at the global scheduler 12 without affecting the independent queues 14. For example, if the rules for the global scheduler 12 are strictly priority based, then the scheduler can service Q1 until either no data is remaining or the queue declares itself "not-ready-to-run" because of an internal rule enforcement. The global scheduler 12 has no idea what the internal rules for Q1 may be. The queue may be "not-ready-to-run" for any number of reasons that do not matter to the global scheduler. The global scheduler only needs to know that a queue that is "not-ready-to-run" and therefore, is not available as a source of data.

Figure 2:
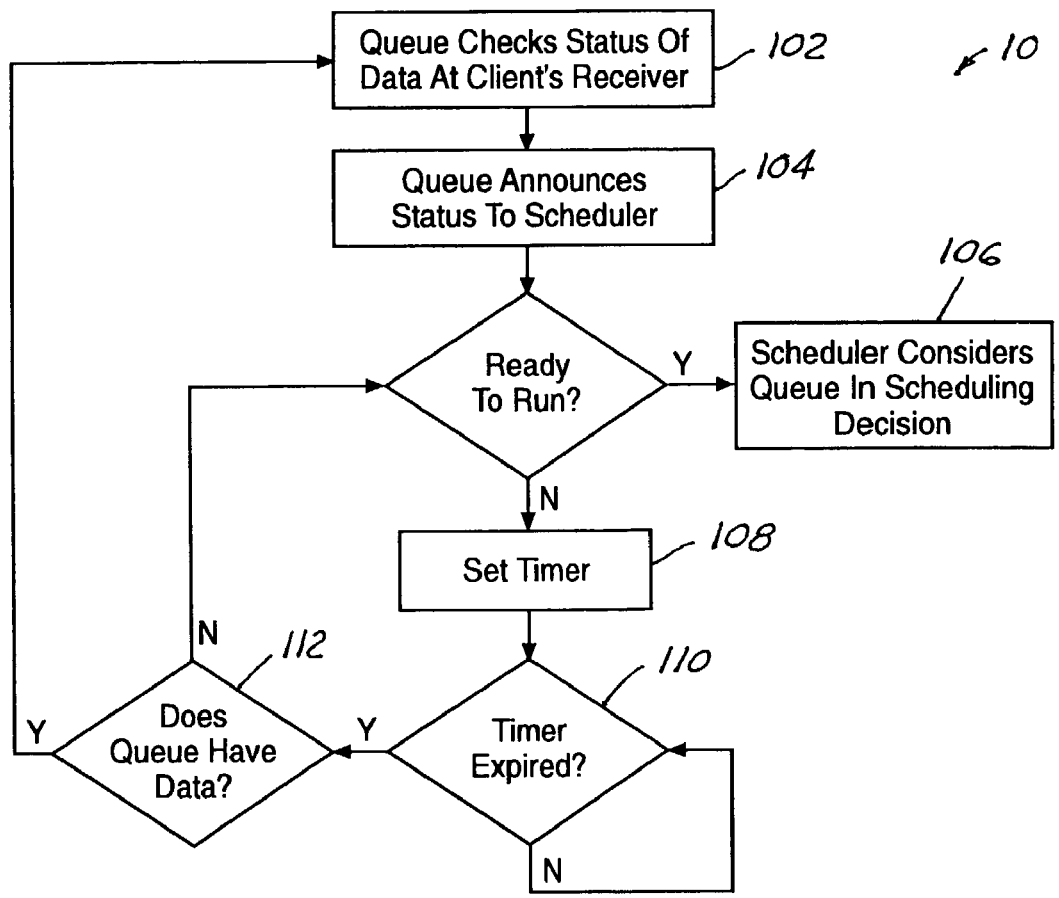
FIG. 2 is a flow chart of the method of the present invention.

Referring now to FIG. 2, a flow chart 100 shows the communication that occurs among the client's receiver, the queues and the global scheduler. A queue will check the status 102 of data at the client's receiver. The queue checks not only for the presence of data, but also the buffering capability and the class of the data.

The status of the data also includes a classification of the data. Classification of the data allows the queue to communicate to the scheduler how to better determine the most efficient use of the queue schedule. For example, in the case of isochronous data, a queue can be programmed to silently overwrite previously queued data. Isochronous data is a delivery model in which the data is only significant for a predetermined period of time. For example, a stock trader depends on real time data to act on a trading policy. Old data is not only useless, but may in fact be detrimental.

In the case where data has lost temporal significance, the queue can be programmed to raise an exception to the scheduler. The scheduler then takes appropriate action, or transfers the exception to another entity with higher control. For example, an exception may be raised so if the data becomes "stale" it will not be delivered to the client receiver. The higher controlling entity such as a software program would be responsible for delivery decisions. In the alternative, a human controller may be responsible for monitoring the broadcast data.

Referring still to FIG. 2, the queue announces 104 its status to the global scheduler. The queue is "ready to run" or "not ready to run". If the queue is ready to run, the global scheduler considers 106 that particular queue in its scheduling decisions. When the queue is not ready to run, a timer is set 108. When the timer expires 110, the queue checks for data 112. When the queue has data, it again checks its status 102 to determine if it is "ready to run".

The scheduler makes scheduling decisions based on several factors. These include, but are not limited to the status of the individual queues, the classification of data in the individual queues, and traffic patterns. The greedy algorithm that incorporates these, and other, factors is used to interface the scheduler with the plurality of queues. Because the queues are self-managed, it is not necessary for the global scheduler to consider client receiver overflow. This is handled locally by the queues.

The classification of the data within the queue allows the scheduler to determine how to handle the queue. In this regard the scheduler can handle both critical and non-critical isochronous data. All other classes of data can be considered to use a best effort delivery policy. A "best effort policy" is typically applied when a producer of data has no, or a limited, expectation of when the data will arrive. For example, in the case of a weather ticker equating to a fifteen minute period will not be significantly affected by the loss of data associated with one missed sample period.

According to the present invention, the queues maintain localized knowledge necessary to effectively manage data to a client receiver. The scheduler analyzes the current condition presented by each queue and attempts to optimize its use among the queues based upon its own set of rules for servicing the queues. The global scheduler and the queues are partitioned, thereby allowing the internal rules of a queue to be modified without affecting the design of the scheduler. Conversely, the rules for the scheduler may be modified without affecting the internal rules of each independent queue. Functionality and complexity are completely separated by the system and method of the present invention.

Figure 3:
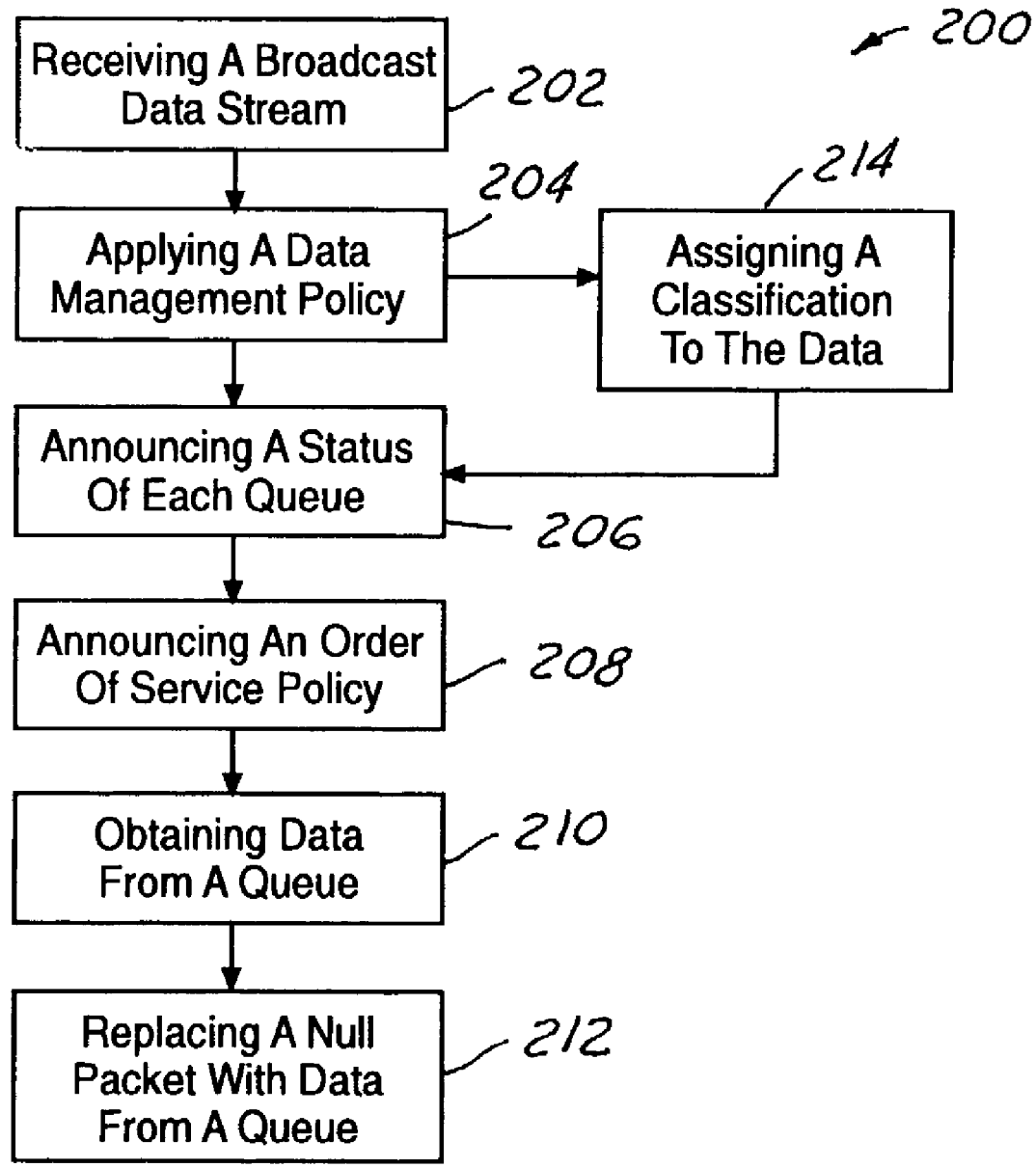
FIG. 3 is a flow chart of the present invention describing the application of the data management policies for the self-managed queues along with the order of service policy for the global scheduler.

FIG. 3 describes the method 200 of the present invention and the application of the data management policies for the self-managed queues along with the order of service policy for the global scheduler. The global scheduler receives 202 a broadcast data stream with null packets.

Each self-managed queue has its own data management policy. Each data management policy has a set of predefined rules, unique to that particular queue. The queue applies 204 the set of predefined rules to determine whether its status is "ready-to-run" or "not-ready-to-run", and then announces 206 its status to the global scheduler. When all of the rules in the set of rules have been met, the queue announces a "ready-to-run" status to the global scheduler. If less than all of the rules have been met, the queue announces a "not-ready-to-run" status.

The global scheduler has its own order of service policy that has rules it applies 208 to determine the order of service for each of the queues having a "ready-to-run" status. The global scheduler need only concern itself with the queues having a "ready-to-run" status. In this regard, the global scheduler can obtain data 210 from the queue and use it to replace 212 the null packets in the broadcast data stream.

It is possible for the data to be assigned 214 a classification. This makes it possible for the global scheduler to determine whether or not to use the data from the "ready-to-run" queue. For example, as discussed above, stale isochronous data, or outdated data will not be used, and the scheduler may identify another "ready-to-run" queue for service.

The invention covers all alternatives, modifications, and equivalents, as may be included within the spirit and scope of the appended claims.

What is claimed is:

1. A system for null packet replacement in a broadcast data stream comprising:
   a global scheduler for receiving data containing null packets from a broadcast source;
   a plurality of self-managed queues in communication with said global scheduler;
   means for implementing a data management policy for each self-managed queue in each of said plurality of self-managed queues wherein said policy has predefined rules for handling data to be communicated to said global scheduler, a predetermined self-managed queue identifies itself to said global scheduler as being available for service at said global scheduler when said predefined rules of said data management policy have been met;
   means for implementing an order of service policy in said global scheduler for determining the order each self-managed queue that has presented itself to the global scheduler as being serviceable will be serviced by the global scheduler, said order of service policy for said global scheduler being separate and distinct from each of said data management policies for said self-managed queues, data from said predetermined queue will replace the null packets in the broadcast data stream with background data thereby defining a modified broadcast data stream upon service of said self-managed queues by said global scheduler;
   a receiver serving at least one client and receiving said modified broadcast stream through said global scheduler from said predetermined self-managed queue.

2. The system as claimed in claim 1 wherein said data management policy further comprises a set of rules internal to each queue whereby each queue is capable of determining when to present itself to said global scheduler for use by said global scheduler independent of each of the other queues and said order of service policy for said global scheduler.

3. The system as claimed in claim 2 wherein said data management policy further comprises a classification of data in said queue to be communicated to said global scheduler from said predetermined queue.

4. The system as claimed in claim 3 wherein said order of service policy is priority based and dependent on said classification of data.

5. The system as claimed in claim 1 wherein said order of service policy is round-robin for each queue in said plurality of queues.

6. A method for null packet replacement in a broadcast data stream comprising the steps of:
   receiving data from a broadcast source at a global scheduler, the data containing null packets, the global scheduler being in communication with a plurality of self-managed queues;
   applying a data management policy in each self-managed queue, the data management policy being unique to each self-managed queue and having a set of predefined rules for determining a status of each self-managed queue, the self-managed queue assigning a "ready-to-run" status and a "not-ready-to-run" status to themselves depending on the set of predefined rules in its respective data management policy;
   communicating the status of each self-managed queue to the global scheduler;
   applying an order of service policy at said global scheduler for determining the order to service each self-managed queue presenting itself to said global scheduler with a "ready-to-run" status, thereby defining a queue available for service at said global scheduler;
   obtaining data from each queue available for service;
   replacing null packets in the broadcast data stream with data obtained from each queue available for service.

7. The method as claimed in claim 6 wherein said step of applying a data management policy to each self-managed queue further comprises each self-managed queue independently determining its status regardless of the status of other queues.

8. The method as claimed in claim 6 further comprising the step of assigning a classification to data in each of said self-managed queues.

9. The method as claimed in claim 8 further comprising the step of using the assigned data classification in the order of service policy in the global scheduler.

10. A method for replacing null packets in a broadcast data stream comprising the steps of:
    checking the status of a self-managed queue in a plurality of self-managed queues at the self-managed queue;
    announcing a "ready-to-run" status of a self-managed queue by the self-managed queue to a global scheduler;
    considering a self-managed queue announced to the global scheduler as a "ready-to-run" status in a decision making analysis at said global scheduler for replacement of data;
    replacing null packets in the data stream with data in the "ready-to-run" self-managed queue considered by the global scheduler;
    announcing a "not-ready-to-run" status of a self-managed queue by the self-managed queue to a global scheduler;
    re-checking the status of the self-managed queue after a predetermined amount of time until the self-managed queue identifies itself to the global scheduler as "ready-to-run."

11. The method as claimed in claim 10 wherein said step of announcing a "ready-to-run" status further comprises the step of applying a data management policy having a predefined set of rules for handling data, the "ready-to-run" status being announced upon the predefined set of rules being met; and
    said step of announcing a "not-ready-to-run" status further comprises the step of applying a data management policy having a predefined set of rules for handling data, the "ready-to-run" status being announced upon less than all of the rules in the predefined set of rules being met.

12. The method as claimed in claim 11 further comprising the data management policy for each queue in the plurality of self-managed queues are independent of each other and not dependent upon the order of service policy for the global scheduler.

13. The method as claimed in claim 10 wherein the data in the queues to replace null packet data is background data in the broadcast data stream.

14. The method as claimed in claim 10 further comprising the steps of:
    assigning a classification to the data in a "ready-to-run" self-managed queue; and
    applying the data classification to the order of service policy used by the global scheduler.

* * * * *